US008645001B2

(12) United States Patent  (10) Patent No.: US 8,645,001 B2
Basson et al.  (45) Date of Patent: Feb. 4, 2014

(54) METHOD AND SYSTEM FOR BLIND SPOT IDENTIFICATION AND WARNING UTILIZING VISUAL INDICATORS

(75) Inventors: Sara H. Basson, White Plains, NY (US); Dimitri Kanevsky, Ossining, NY (US); Edward E. Kelley, Wappingers Falls, NY (US); Frances West, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 11/849,560

(22) Filed: Sep. 4, 2007

(65) Prior Publication Data

US 2009/0063053 A1  Mar. 5, 2009

(51) Int. Cl.
*G06F 19/00* (2011.01)

(52) U.S. Cl.
USPC ..................... 701/1; 359/22; 702/1

(58) Field of Classification Search
USPC ..................... 701/1; 702/1; 359/22
See application file for complete search history.

(56) References Cited

U.S. PATENT DOCUMENTS

| | | | | |
|---|---|---|---|---|
| 4,438,425 A * | 3/1984 | Tsuchida et al. | ............. | 307/10.1 |
| 4,897,633 A * | 1/1990 | Kuwano | ............. | 340/458 |
| 5,786,772 A * | 7/1998 | Schofield et al. | ............. | 340/903 |
| 5,929,786 A * | 7/1999 | Schofield et al. | ............. | 340/903 |
| 6,200,139 B1 * | 3/2001 | Clapper | ............. | 434/62 |
| 6,441,943 B1 * | 8/2002 | Roberts et al. | ............. | 359/267 |
| 6,703,999 B1 * | 3/2004 | Iwanami et al. | ............. | 345/158 |
| 6,894,608 B1 * | 5/2005 | Gunderson | ............. | 340/468 |
| 6,927,677 B2 | 8/2005 | Anderson et al. | | |
| 7,049,945 B2 | 5/2006 | Breed et al. | | |
| 7,079,017 B2 | 7/2006 | Lang et al. | | |
| 7,129,829 B2 * | 10/2006 | Chan | ............. | 340/475 |
| 7,602,278 B2 * | 10/2009 | Prost-Fin et al. | ............. | 340/438 |
| 2002/0003571 A1 * | 1/2002 | Schofield et al. | ............. | 348/148 |
| 2002/0005778 A1 * | 1/2002 | Breed et al. | ............. | 340/435 |
| 2003/0209893 A1 * | 11/2003 | Breed et al. | ............. | 280/735 |
| 2004/0114384 A1 * | 6/2004 | Carter et al. | ............. | 362/494 |
| 2005/0111117 A1 | 5/2005 | Qualich et al. | | |
| 2005/0195383 A1 | 9/2005 | Breed et al. | | |
| 2006/0006988 A1 | 1/2006 | Harter, Jr. et al. | | |
| 2006/0119473 A1 | 6/2006 | Gunderson et al. | | |
| 2006/0167606 A1 * | 7/2006 | Malhas | ............. | 701/49 |
| 2006/0290482 A1 | 12/2006 | Matsumoto et al. | | |
| 2007/0058257 A1 * | 3/2007 | Lynam | ............. | 359/604 |
| 2008/0012938 A1 * | 1/2008 | Kubota et al. | ............. | 348/118 |
| 2009/0045928 A1 * | 2/2009 | Rao et al. | ............. | 340/435 |

* cited by examiner

*Primary Examiner* — John Q Nguyen
*Assistant Examiner* — Kyung Kim
(74) *Attorney, Agent, or Firm* — Cantor Colburn LLP

(57) ABSTRACT

A method for detecting and alerting a driver of vehicles in their blind spots, includes: tracking movement and relative position of a driver to one or more vehicles; determining one or more driver blind spots; determining when at least one of the one or more vehicles approaches one of the driver blind spots; determining when at least one of the one or more vehicles occupies one of the driver blind spots; activating one or more indicators in response to one or more vehicles approaching and occupying one of the driver blind spots; wherein the one or more indicators comprise light emitting diodes (LED), liquid crystal display (LCD), plasma, projected elements, and electroluminescent elements; and wherein a sequence and pattern of activating the one or more indicators is determined based on the relative position of the driver to the one or more vehicles.

20 Claims, 6 Drawing Sheets

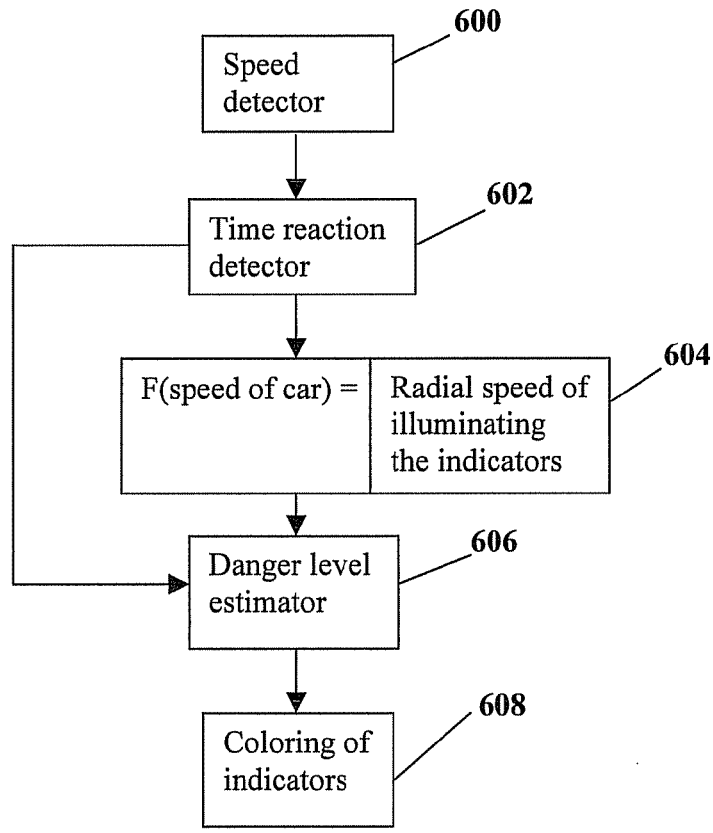
FIG. 6
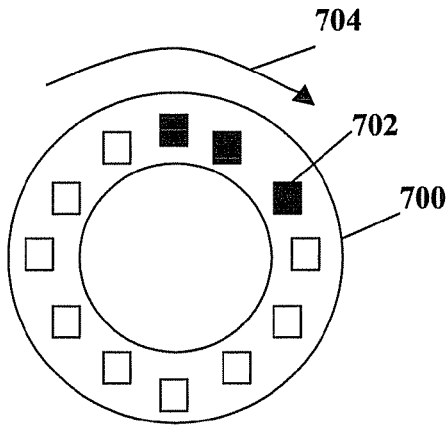
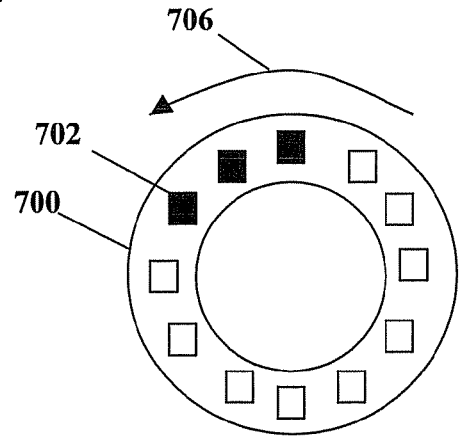
FIG. 7A
FIG. 7B

METHOD AND SYSTEM FOR BLIND SPOT IDENTIFICATION AND WARNING UTILIZING VISUAL INDICATORS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to vehicle blind spot identification, and more particularly to a method and system for alerting a driver to the presence of vehicles in their blind spot.

2. Description of the Related Art

A major contributor to vehicle accidents is blind spots in the rear side perspective views of a driver. The driver blind spots occur when a second vehicle is traveling slightly behind and along side the driver's vehicle in an accompanying lane. Blind spot accidents occur when a driver switches lanes and is unaware that a second vehicle is occupying the intended new lane. As a result, a collision between the two vehicles occurs. Driver blind spots exist despite the fact that vehicles are equipped with a series of view mirrors to assist the driver. The series of mirrors are generally configured as a rear view mirror that is internally mounted above the front windshield in the center of the vehicle, and one or two external side mirrors that are mounted on the front side portions of the vehicle. The series of mirrors are designed to allow the driver to have a rear view without having to turn their head to the rear.

External side mirrors and the rear view mirror reduce the driver blind spots. However, it is nearly impossible to eliminate all blind spots with mirror adjustment. The exact area of the driver blind spot varies depending on the type of vehicle and height of the driver. Accordingly, rear blind spots for midsize sedans range between 12-17 feet behind the vehicle, mini vans range from 13-23 feet, and midsize trucks between 29-51 feet. Each of the ranges accounts for various heights of the driver. Tractor-trailer drivers encounter a much larger visual impairment. The blind spots are located on either side, the rear, and directly in front of the tractor-trailer. In the US, over 200,000 accidents between cars and trucks occur each year.

Current efforts to solve the driver blind spot problem have been directed towards developing a blind spot monitoring system that will alert the driver of vehicles that are present in their blind spots. One example of a blind spot monitor includes a camera mounted on the back bumper of a car that shows the driver video feeds of objects behind the car when it is in reverse. Another option called VORAD (Vehicle Onboard Radar) transmits and receives microwave signals, alerting a driver to obstructions. The VORAD system can penetrate through environmental conditions such as darkness, fog, dust, and smoke. The VORAD system is currently used on busses to detect vehicles along the side and in front of the bus. A lane-changing alarm is another product available to consumers. The lane changing alarm is designed using a passive infrared sensor that detects the heat of a moving tire and a light emitting diode (LED) that flashes when vehicles, pedestrians, or other objects are in the side blind spot. A product designed for commercial vehicles employs ultrasonic sensors mounted on the outside of the vehicle to detect obstructions at slow speeds.

SUMMARY OF THE INVENTION

Embodiments of the present invention include a method and system for detecting and alerting a driver of vehicles in their blind spots, the method includes: tracking movement and relative position of a driver to one or more vehicles; determining one or more driver blind spots; determining when at least one of the one or more vehicles approaches one of the driver blind spots; determining when at least one of the one or more vehicles occupies one of the driver blind spots; activating one or more indicators in response to one or more vehicles approaching and occupying one of the driver blind spots; wherein the one or more indicators comprise light emitting diodes (LED), liquid crystal display (LCD), plasma, projected elements, and electroluminescent elements; and wherein a sequence and pattern of activating the one or more indicators is determined based on the relative position of the driver to the one or more vehicles.

A system for detecting and alerting a driver of vehicles in their blind spots, the system includes: one or more indicators; one or more monitoring and tracking devices that are configured with software; wherein the tracking devices determine the relative position of a driver to one or more vehicles; wherein the tracking devices comprise at least one of the following: a global position satellite (GPS) system, cameras, and radar; wherein the tracking devices transmit the relative position of the driver to the one or more vehicles to the monitoring devices; wherein the monitoring devices calculate blind spot hazards based on the tracking devices transmissions; wherein monitoring devices issue activation signals to the one or more indicators in response to a vehicle approaching and occupying determined blind spot hazards; wherein the one or more indicators comprise light emitting diodes (LED), liquid crystal display (LCD), plasma, projected elements, and electroluminescent elements; and wherein a sequence and pattern of activating the one or more indicators is determined based on the relative position of the driver to the one or more vehicles.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for utilizing indicators to enhance driver awareness of a vehicle entering into a driver's blind spot.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 is a detailed operational block diagram for the data mapping (block 508) of FIG. 5 for controlling blind spot indicators according to an embodiment of the invention.

FIGS. 7A and 7B illustrate a steering wheel equipped with radial indicators to denote a vehicle approaching a driver's blind spot according to embodiments of the invention.

Figure 1:
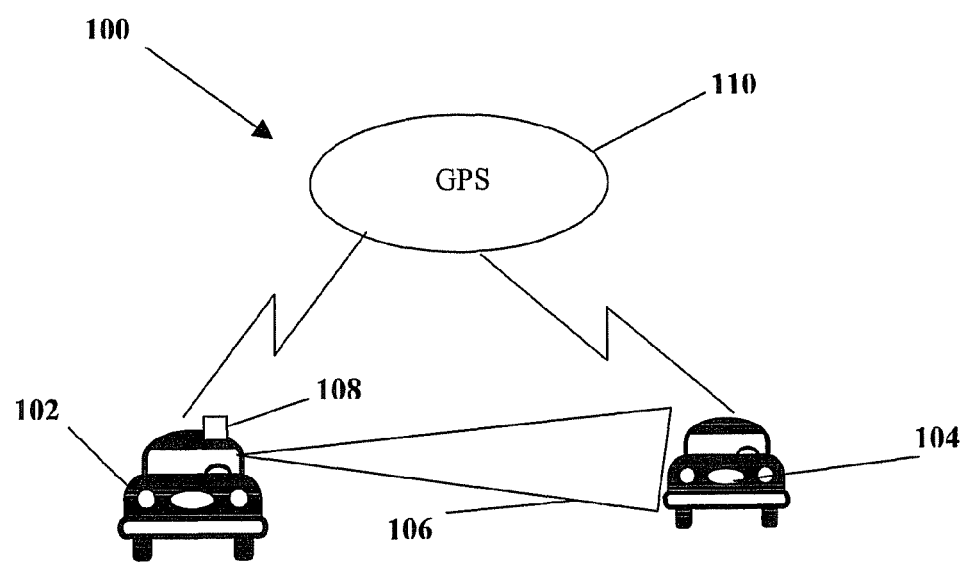
FIG. 1 illustrates a system for warning a driver of a vehicle in their blind spot according to embodiments of the invention.

The detailed description explains the preferred embodiments of the invention, together with advantages and features, by way of example with reference to the drawings.

DETAILED DESCRIPTION

Embodiments of the invention provide a method and system for providing a driver of a vehicle a warning of the approach into and the presence of another vehicle in the driver's blind spot. The blind spot warning system utilizes a series of sensors attached to the driver's vehicle, forms of radar, and global positioning system (GPS) satellites to detect the presence and relative position of vehicles to a driver's blind spot. The series of sensors are connected to a blind spot warning device. In embodiments of the invention, the blind spot warning device issues a warning to the driver of the vehicle through a series of indicators in the form of lights embedded in the steering wheel, dashboard, mirrors, or projected onto the windshield in front of the driver. The indicator lights may take the form of, but are not limited to, light emitting diodes (LED), liquid crystal display (LCD), plasma, and electroluminescent elements elements. Embodiments of the invention indicate whether vehicles are approaching from the left or right side of the driver, as well as indicating the changing position and relative speed of the approaching vehicle.

The determination of a driver's blind spot does not solely depend on the relative position of a driver's vehicle to other vehicles, but also on the position of the driver in the vehicle, their height, and where they are looking. Embodiments of the invention use recognition technology to detect the position of a driver's head and eyes and utilizes relative vehicle position data to determine whether driver's see approaching vehicles, either in their vehicle's windows or mirrors. Additional embodiments utilize pre-calculated mathematical models based on the vehicle type of the driver to determine the driver's blind spots. A system that may monitor inside of a car is described in U.S. Pat. No. 6,792,339 entitled "Artificial Passenger with Condition Sensors" and is hereby incorporated by reference herein. A workload manager collects information from on board vehicle sensors and external sensors with regards to vehicle location, speed, and direction of travel. Workload managers are described in patent application publication U.S. 20050192730 entitled "Driver Safety Manager" and is hereby incorporated by reference herein.

In an embodiment of the invention colored lighting elements, such as red and greed light emitting diodes (LED), for example, are placed in a vehicle steering wheel between the ten o'clock and two o'clock positions. A driver is alerted when a vehicle approaches their vehicle on the left with red indicators, and when a vehicle approaches on the right with green indicators. In this embodiment, when a vehicle approaches from the left side, the red indicator lights begin to light up from the left part (ten o'clock position) of the steering wheel, and proceed to light up the indicators sequentially from left to right as the approaching vehicle begins to occupy the driver's blind spot. When the vehicle completely occupies the driver's blind spot all the indicators are lit. As the vehicle begins to leave the driver's blind spot, the indicators, starting from the extreme left begin to turn off. When the vehicle is completely out of the blind spot, all of the indicators are turned off. In a similar manner, when a vehicle approaches from the right side, the green indicators begin to light up, starting from the right part (two o'clock position) of the steering wheel, and proceed to light up the indicators sequentially from right to left as the approaching vehicle begins to occupy the driver's blind spot. When the vehicle completely occupies the driver's blind spot all the indicators are lit. When the vehicle begins to leave the driver's blind spot, the indicators, starting from the extreme right begin to turn off. When the vehicle is completely out of the blind spot, all of the indicators are turned off.

In an embodiment of the invention the blind spot indicators in the steering wheel are distributed completely around the steering wheel, and a lit section of indicators rotates around the steering wheel in a direction that indicates the side that a vehicle is approaching from. The speed at which the indicators rotate around the steering wheel is proportional to the relative speed of the approaching vehicle to the driver's vehicle. The colors of the indicators may also indicate the degree of danger presented by the approaching vehicle.

In additional embodiments of the invention, the blind spot indicators are positioned on the interior rear view mirror or the exterior rear view mirrors. The red (left) and green (right) indicators are placed on the upper half periphery of the mirrors. For example, when a vehicle approaches from the left side, the red indicators begin to light up, starting from the left part of the mirror, and proceed to the right part of the mirror as the approaching vehicle moves completely into the blind spot. As the vehicle exits the blind spot, the indicators, starting from the extreme left begin to turn off. When the vehicle is completely out of the blind spot, all the indicators are turned off. In a similar manner, when a vehicle approaches from the right, the same sequence occurs except the indicators are green, and the indicators are lit starting from the right side of the mirror.

FIG. 1 illustrates a situation 100 according to an embodiment of the invention, where a driver in vehicle 102 has a blind spot 106, and a GPS 110 detects when a vehicle 104 travels into the blind spot 106. In situation 100, both vehicle 102 and vehicle 104 are equipped with GPS chipsets to relay their relative positions. A camera 108 is mounted on vehicle 102 to provide observational information on the driver in vehicle 102 for the determination of their potential blind spots.

Figure 2A:
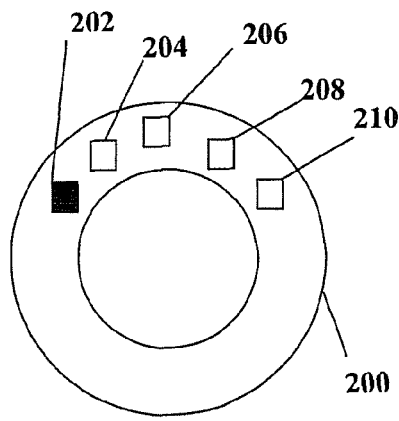
FIGS. 2A-2F illustrate a steering wheel equipped with lights to indicate a vehicle entering a driver's blind spot, and the direction of approach of the vehicle, according to embodiments of the invention.
Figure 2D:
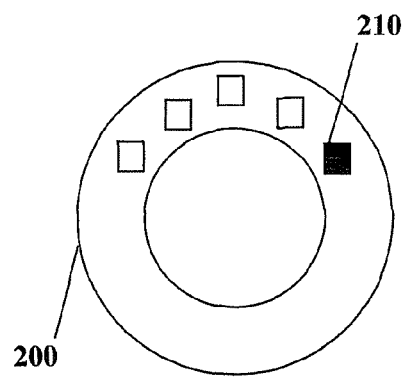
Figure 2B:
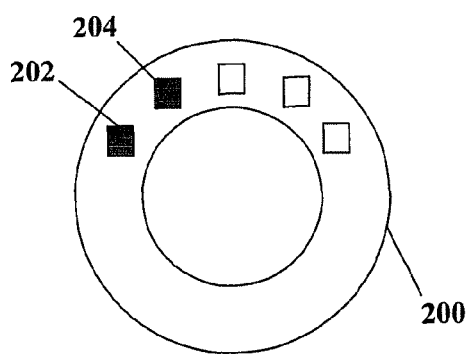
Figure 2E:
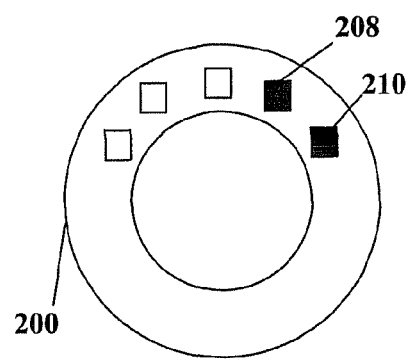
Figure 2C:
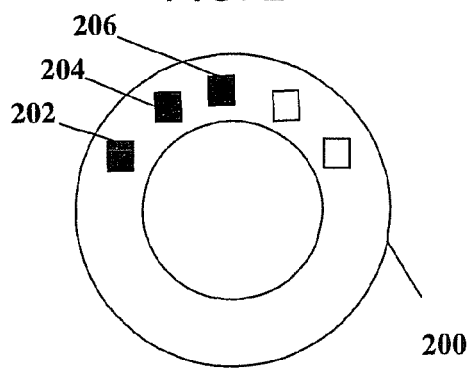

FIGS. 2A-2F illustrate a steering wheel 200 equipped with a series of indicators (202, 204, 206, 208, 210) to denote a vehicle entering a driver's blind spot, and the direction of approach of the vehicle, according to embodiments of the invention. FIGS. 2A-2C illustrate a vehicle entering a driver's blind spot from the left. In FIG. 2A, the first indicator 202 is illuminated to denote the partial entry of a vehicle into a blind spot on the driver's left side. In FIG. 2B, the vehicle continues to advance into the driver's blind spot on their left side as denoted by indicators 202 and 204 being illuminated. In FIG. 2C, the vehicle is completely in the driver's blind spot as denoted by indicators 202, 204, and 206 being illuminated.

Figure 2F:
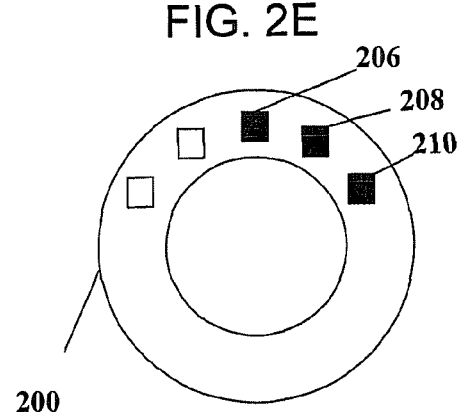

FIGS. 2D-2F illustrate a vehicle entering a driver's blind spot from the right. In FIG. 2D, the first indicator 210 is illuminated to denote the partial entry of a vehicle into a blind spot on the driver's right side. In FIG. 2E, the vehicle continues to advance into the driver's blind spot on their right side as denoted by indicators 210 and 208 being illuminated. In FIG. 2F, the vehicle is completely in the driver's right side blind spot as denoted by indicators 210, 208, and 206 being illuminated.

Figure 3:
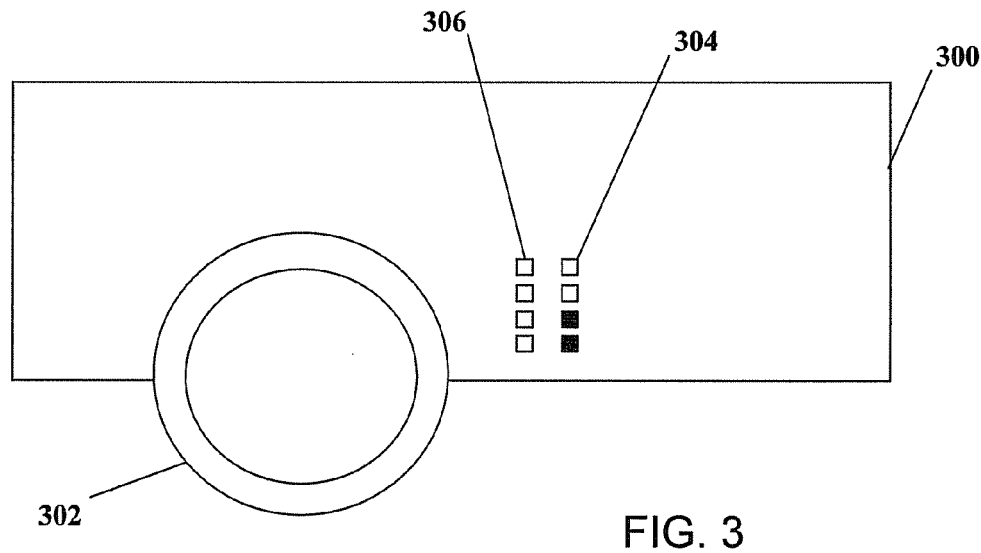
FIG. 3 illustrates a dashboard equipped with light indicators for warning a driver when a vehicle enters a driver's bind spot, and from what direction the vehicle is approaching, according to embodiments of the invention.

FIG. 3 illustrates a dashboard 300 equipped with indicators (304, 306) for warning a driver when a vehicle enters a driver's bind spot, and from what direction the vehicle is approaching, according to embodiments of the invention. In the example embodiment of FIG. 3, the indicators (304, 306) are positioned on the dashboard 300 in close proximity to the steering wheel 302, so as to be in the field of vision of the driver. The indicators 306 are configured to provide a visual warning of vehicles entering and passing through a blind spot on the driver's left. The indicators 304 provide a visual warning of vehicles entering and passing through a blind spot on the right side of the vehicle. In FIG. 3, two segments of the indicator 304 are illuminated, thereby notifying the driver that a passing vehicle is approximately halfway into the driver's right side blind spot.

Figure 4:
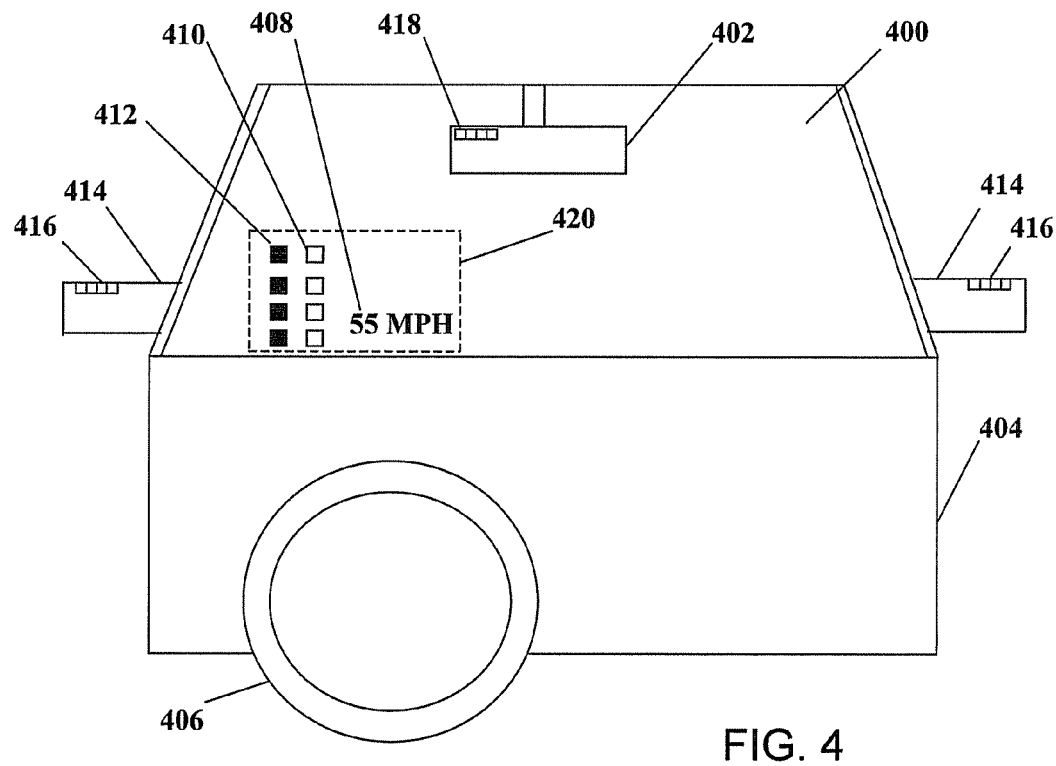
FIG. 4 illustrates a heads up display projected on a windshield, and mirror mounted lights for warning a driver when a vehicle enters a driver's bind spot, and from what direction the vehicle is approaching, according to embodiments of the invention.

FIG. 4 illustrates a heads up display 420 with blind spot indicators (410, 412) projected on a windshield 400, and minor mounted blind spot indicators 416 and 418 on the side view minors 414 and rear view mirror 402, respectively, for warning a driver when a vehicle enters a driver's bind spot, and that also indicate what direction the vehicle is approaching from, according to embodiments of the invention. The heads up display 420 presents the driver with driving parameters above the dashboard 404, for example their speed 408, in a translucent manner on the windshield 400 that does not obstruct the view of the road ahead, above the steering wheel 406, for example. In FIG. 4, the heads up blind spot indicators 412 are all illuminated denoting a vehicle has completely entered the driver's left side blind spot. The minor mounted blind spot indicators (416, 418) begin to illuminate from the side direction (left or right) that a vehicle is approaching from, and are completely illuminated when an approaching vehicle completely occupies a driver's blind spot.

Figure 5:
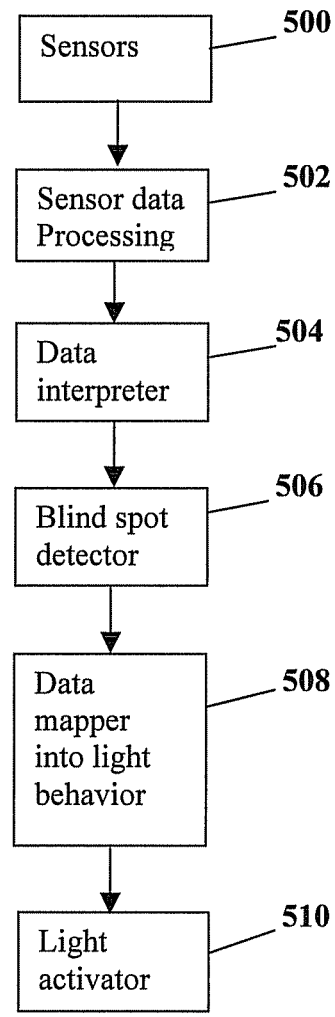
FIG. 5 is an operational block diagram for controlling blind spot light indicators according to embodiments of the invention.

FIG. 5 is an operational block diagram for controlling blind spot light indicators according to embodiments of the invention. Sensors (block 500), such as GPS, on-board vehicle cameras, and on-board radar, for example, provide their outputs for data processing (block 502). A data interpreter (block 504) provides pertinent information to the blind spot detector (block 506) for final processing, and for mapping the detected blind spot information into light behavior (block 508) for a light activator (block 510) to control the blind spot indicators. Examples of light behavior include, the adjustment of indicator color to denote the direction from which a vehicle is approaching or for indicating the level of potential danger.

FIG. 6 is a detailed operational block diagram for the data mapping (block 508) of FIG. 5 for controlling blind spot indicators according to an embodiment of the invention. The speed detector (block 600) determines the relative closing speed of the approaching vehicle based on the observed speed of the approaching vehicle, and the speed of the driver's vehicle as provided by the blind spot detector (block 506). The time reaction detector (block 602) utilizes the relative closing speed measurement to determine an estimate for the level of potential danger (block 606). The determined level of danger may be used to control the color of the blind spot indicators (block 608). For example, the color red may be used to denote a high degree of danger to the driver, while green may be used for a low level of danger to the driver.

FIGS. 7A and 7B illustrate a steering wheel 700 equipped with radial indicators 702 to indicate a vehicle approaching a driver's blind spot according to embodiments of the invention. The direction of rotation of the lighted indicators denotes the side from which the vehicle is approaching. For example, in FIG. 7A the radial indicators 702 are illuminated in a clockwise direction as denoted by arrow 704 to indicate a vehicle that is approaching from the left. In FIG. 7B, the radial indicators 702 are illuminated in a counter clockwise direction as denoted by arrow 706 to indicate a vehicle approaching on the right. The speed of the rotation of the radial indicator may be made proportional to the closing speed of the approaching vehicle as shown in block 608 of FIG. 6.

Figure 8:
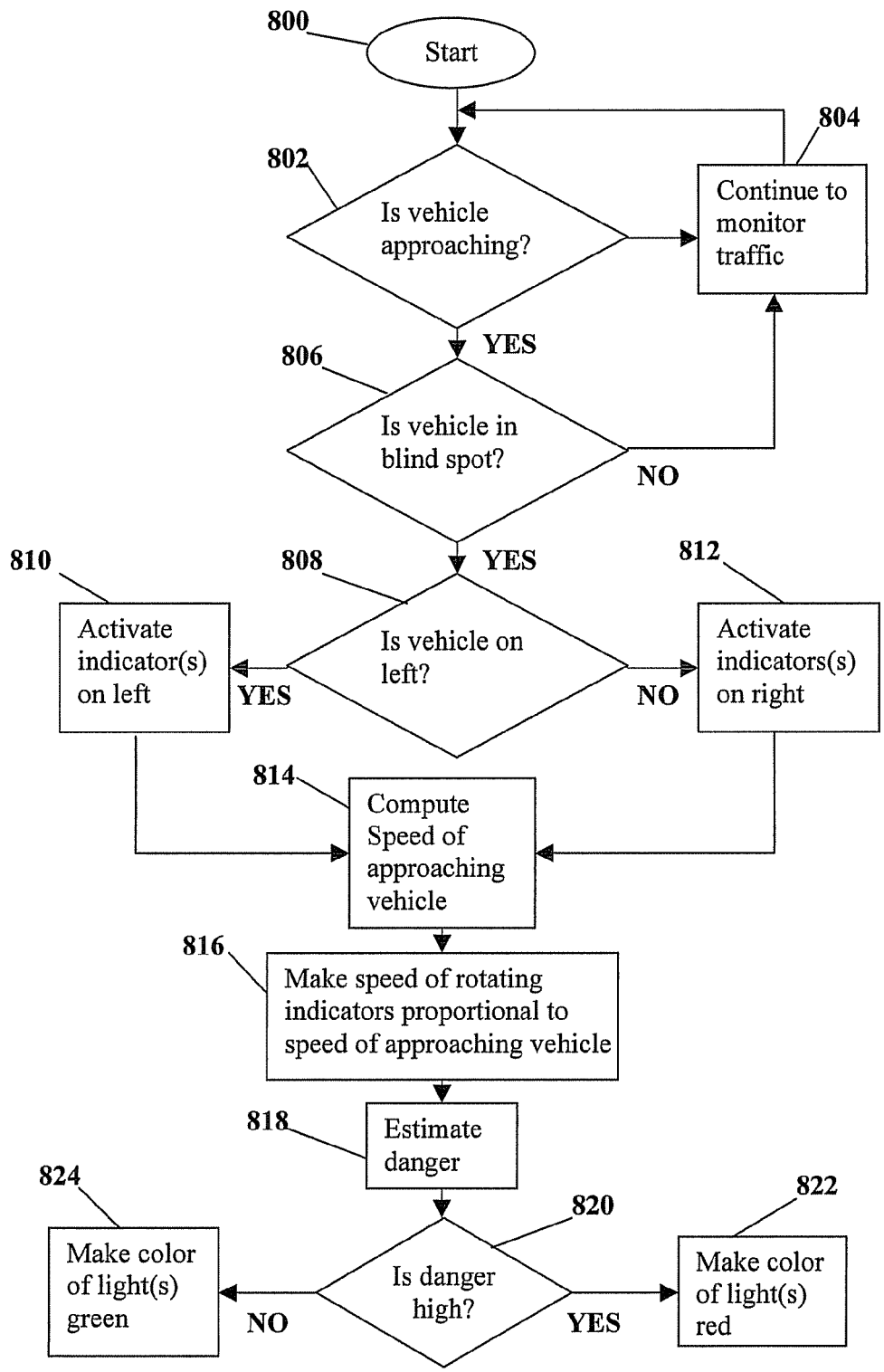
FIG. 8 is a flow chart of employing light indicators for indicating a vehicle approaching and entering a driver's blind spot according to embodiments of the invention.

FIG. 8 is a flow chart of employing light indicators for indicating a vehicle approaching and entering a driver's blind spot according to embodiments of the invention. The process starts (block 800) with the continuous monitoring for potential approaching vehicles (block 802 is NO, block 804). If there is an approaching vehicle (block 802 is YES), but the approaching vehicle is not in a blind spot, the monitoring continues (block 804). However, if the approaching vehicle is in the driver's blind spot (block 806 is YES), the blind spot detector (block 506) makes a determination on which side the approaching vehicle is. If the approaching vehicle is on the left (block 808 is YES) the left side indicators are activated (block 810), or if the vehicle is approaching from the right the right side indicators are activated (block 812). For the embodiment of FIGS. 7A and 7B the process continues with the computation of the relative closing speed of the approaching vehicle (block 814) to establish the rotational speed (block 604) of the indicators 702 in proportion to the approaching vehicles closing speed (block 816). Based on the closing speed of the approaching vehicle an estimate of the potential danger to the driver (block 818) is made with the danger level estimator (block 606). If the danger to the driver is high (block 820 is YES) the blind spot indicators 702 are red, for example. If the immediate danger to the driver is not high (block 820 is NO) the blind spot indicators 702 are green, for example.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting and alerting a driver of vehicles in their blind spots, the method comprising:
    tracking movement and position of a driver in a vehicle, the position calculated relative to the interior of the vehicle;
    determining one or more driver blind spots, in response to the tracking;
    determining the position of the driver relative to one or more other vehicles;
    determining when at least one of the one or more vehicles approaches one of the driver blind spots, in response to the determining the position of the driver relative to one or more other vehicles and the determining of the one or more driver blind spots;
    determining when at least one of the one or more other vehicles occupies one of the driver blind spots;
    activating one or more indicators in response to one or more vehicles approaching or occupying one of the driver blind spots;
    calculating a blind spot risk by determining the closing speed of approaching vehicles based on an approaching vehicle speed in conjunction to a speed of the driver vehicle;
    wherein the one or more indicators comprise light emitting diodes (LED), liquid crystal display (LCD), plasma, projected elements, and electroluminescent elements; and
    wherein a sequence and pattern of activating the one or more indicators is determined based on the position of the driver in relation to the one or more other vehicles.

2. The method of claim 1, wherein the tracking and determining the position of the driver in relation to the one or more other vehicles is conducted with at least one of the following: a global position satellite (GPS) system, cameras, and radar.

3. The method of claim 1, wherein the determining of the driver's blind spots are pre-calculated with mathematical models.

4. The method of claim 1, wherein the determining of the driver's blind spots is accomplished with recognition technology to detect the position of a driver's head and eyes; and
    wherein the detected position of the driver's head and eyes is utilized with relative vehicle position data to determine whether driver sees approaching vehicles.

5. The method of claim 1, wherein the indicators employ colors to denote various levels of danger to the driver; and
    wherein the level of danger is based on the position and relative speed of the approaching vehicle.

6. The method of claim 1, wherein the indicators denote whether vehicles are approaching from the left or right side of the driver, as well as indicating the changing position and relative speed of the approaching vehicle.

7. The method of claim 6, wherein the indicators employ colors to indicate the direction from which the vehicles are approaching.

8. The method of claim 1, wherein the indicators are embedded in at least one of the following: a steering wheel, a dashboard, a rear view mirror, and side view mirror.

9. The method of claim 1, wherein the indicators are embedded in an arc on an upper portion of a steering wheel of the vehicle;
    wherein the indicators begin to activate in a counter clockwise direction from the left side of the arc as a vehicle approaches and starts to occupy the driver's blind spot from the left;
    wherein the indicators begin to activate in a clockwise direction from the right side of the arc as a vehicle approaches and starts to occupy the driver's blind spot from the right; and
    wherein the arc is completely activated when the approaching vehicle is entirely within the driver's blind spot.

10. The method of claim 1, wherein the indicators are embedded in a complete circle within a steering wheel of the vehicle;
    wherein the indicators begin to activate and rotate in a counter clockwise direction from the left side of the circle as a vehicle approaches and starts to occupy the driver's blind spot from the left; and
    wherein the indicators begin to activate and rotate in a clockwise direction from the right side of the circle as a vehicle approaches and starts to occupy the driver's blind spot from the right.

11. The method of claim 10, wherein the rotational speed of the activated indicators is proportional to the speed of the approaching vehicle.

12. The method of claim 1, wherein the indicators are projected on to the windshield in front of the driver in a translucent manner so as not to obstruct their view.

13. A system for detecting and alerting a driver of vehicles in their blind spots, the system comprising:
    one or more indicators;
    one or more monitoring and tracking devices that are configured with software;
    wherein the tracking devices determine the position of a driver in a vehicle, the position calculated relative to the interior of the vehicle;
    wherein the tracking devices comprise at least one of the following: a global position satellite (GPS) system, cameras, and radar;
    wherein the tracking devices determines the position of the driver relative to one or more other vehicles
    wherein the tracking devices transmit the position of the driver relative to the one or more other vehicles to the monitoring devices;
    wherein the monitoring devices calculate blind spot hazards based on the position of the driver relative to the one or more other vehicles transmitted by the tracking devices;
    wherein the monitoring devices issue activation signals to the one or more indicators in response to a vehicle approaching or occupying the calculated blind spot hazards, and the position of the driver relative to the one or more other vehicles;
    wherein the monitoring devices calculate a blind spot risk by determining the closing speed of approaching vehicles based on an approaching vehicle speed in conjunction to a speed of the driver vehicle;
    wherein a time reaction detector estimates the potential danger of the blind spot risk in response to the calculating;
    wherein the one or more indicators comprise light emitting diodes (LED), liquid crystal display (LCD), plasma, projected elements, and electroluminescent elements; and wherein a sequence and pattern of activating the one or more indicators is determined based on the relative position of the driver to the one or more vehicles.

14. The system of claim 13, wherein the indicators employ colors to denote various levels of danger to the driver; and
wherein the level of danger is based on the position and relative speed of the approaching vehicle.

15. The system of claim 13, wherein the indicators denote whether vehicles are approaching from the left or right side of the driver, as well as indicating the changing position and relative speed of the approaching vehicle.

16. The system of claim 13, wherein the indicators employ colors to indicate the direction from which the vehicles are approaching.

17. The system of claim 13, wherein the indicators are embedded in at least one of the following: a steering wheel, a dashboard, a rear view mirror, and side view mirror.

18. The system of claim 13, wherein the indicators are embedded in an arc on an upper portion of a steering wheel of the vehicle;
wherein the indicators begin to activate in a counter clockwise direction from the left side of the arc as a vehicle approaches and starts to occupy the driver's blind spot from the left;
wherein the indicators begin to activate in a clockwise direction from the right side of the arc as a vehicle approaches and starts to occupy the driver's blind spot from the right; and
wherein the arc is completely activated when the approaching vehicle is entirely within the driver's blind spot.

19. The system of claim 13, wherein the indicators are embedded in a complete circle within a steering wheel of the vehicle;
wherein the indicators begin to activate and rotate in a counter clockwise direction from the left side of the circle as a vehicle approaches and starts to occupy the driver's blind spot from the left;
wherein the indicators begin to activate and rotate in a clockwise direction from the right side of the circle as a vehicle approaches and starts to occupy the driver's blind spot from the right; and
wherein the rotational speed of the activated indicators is proportional to the speed of the approaching vehicle.

20. The system of claim 13, wherein the indicators are projected on to the windshield in front of the driver in a translucent manner so as not to obstruct their view.

\* \* \* \* \*